United States Patent
Nagwanshi et al.

(10) Patent No.: US 8,328,251 B2
(45) Date of Patent: Dec. 11, 2012

(54) ASYMMETRIC ENERGY ABSORBER AND METHOD OF MAKING AND USING THE SAME

(75) Inventors: Dhanendra Kumar Nagwanshi, Bangalore (IN); Somasekhar Venkat Bobba, Bangalore (IN); Sudhakar Ramamoorthy Marur, Bangalore (IN)

(73) Assignee: Sabic Innovative Plastics IP B.V. (NL)

( * ) Notice: Subject to any disclaimer, the term of this patent is extended or adjusted under 35 U.S.C. 154(b) by 0 days.

(21) Appl. No.: 12/970,987

(22) Filed: Dec. 17, 2010

(65) Prior Publication Data
US 2012/0153647 A1 Jun. 21, 2012

(51) Int. Cl.
*B60R 19/18* (2006.01)
(52) U.S. Cl. ............ 293/120; 293/121; 296/187.04
(58) Field of Classification Search .......... 296/187.04, 296/187.09, 187.03; 293/102, 120, 133, 293/121; 188/371, 377
See application file for complete search history.

(56) References Cited

U.S. PATENT DOCUMENTS

| | | | |
|---|---|---|---|
| 6,513,843 B1 | 2/2003 | Frederick et al. | |
| 6,755,459 B2 * | 6/2004 | Thelen et al. | 296/187.04 |
| 6,971,690 B2 * | 12/2005 | Evans et al. | 293/102 |
| 6,997,490 B2 * | 2/2006 | Evans et al. | 293/120 |
| 7,144,054 B2 * | 12/2006 | Evans | 293/120 |
| 7,188,876 B2 * | 3/2007 | Jaarda et al. | 293/133 |
| 7,628,444 B2 * | 12/2009 | Cormier et al. | 296/187.03 |
| 7,938,462 B2 * | 5/2011 | Nilsson | 293/102 |
| 7,992,905 B2 * | 8/2011 | Kusche et al. | 293/133 |
| 2006/0261611 A1 | 11/2006 | Mohapatra et al. | |
| 2009/0072557 A1 * | 3/2009 | Roddy et al. | 293/120 |
| 2009/0167037 A1 | 7/2009 | Czopek et al. | |

OTHER PUBLICATIONS

International Search Report; International Application No. PCT/IB2011/055594; International Filing Date: Dec. 9, 2011; Date of Mailing: Apr. 4, 2012; 4 Pages.
Written Opinion of the International Searching Authority; International Application No. PCT/IB2011/055594; International Filing Date: Dec. 9, 2011; Date of Mailing: Apr. 4, 2012; 5 Pages.

* cited by examiner

*Primary Examiner* — Glenn Dayoan
*Assistant Examiner* — Gregory Blankenship
(74) *Attorney, Agent, or Firm* — Cantor Colburn LLP

(57) ABSTRACT

In one embodiment, an asymmetric energy absorber can comprise: an upper wall and a lower wall defining crush lobes; a flange, wherein the lower wall is between the flange and the upper wall; a base extending between the lower wall and the flange, wherein the flange extends from a first side of the base; and a rib extending along the base toward the flange and away from a second side of the base. In an embodiment, a vehicle bumper system, can comprise: a bumper beam having an outer face and a bottom surface; an asymmetric energy absorber. The asymmetric energy absorber can comprise: a generally triangular shaped section formed by an upper wall extending from an upper wall first end toward a lower wall to a joining area; a base extending from a second end of the lower wall opposite the joining area and in a direction away from the upper wall; a flange extending away from the base, below the lower wall; and a rib extending from the base along the bottom surface of the bumper beam.

24 Claims, 5 Drawing Sheets

ASYMMETRIC ENERGY ABSORBER AND METHOD OF MAKING AND USING THE SAME

BACKGROUND

The present disclosure relates generally to energy absorbers for use in a vehicle, for example, to reduce injuries (e.g., to occupant(s), pedestrian(s), etc.) and/or to reduce vehicle damage.

Increased importance has been placed on methods for minimizing the amount of injury suffered by a person in an accident as well as the amount of vehicle damage. Different regulatory committees assess automotive pedestrian and occupant impact performance globally. Depending on the overall performance, vehicles are assigned a cumulative safety rating. Each and every component of the vehicle needs to satisfy the specific impact criteria in order to ensure a good overall rating for the vehicle.

As a result, in the current competitive automotive market, one of the biggest challenges for a design engineer for pedestrian safety is to reduce the system cost while controlling the knee bending in a minimum packaging space with aggressive styling of vehicle front. At present, original equipment manufacturers (OEMs) are very aggressive regarding lower bumper system mass, as the system includes at least two components, an upper energy absorber and a lower leg support.

This generates the need to design an energy absorber that will deform and absorb impact energy to ensure a good vehicle safety rating, while meeting lower leg impact ratings and, desirably, with a decreased weight and lower amount of packaging space resulting in lower cost and increased design freedom. Therefore, the automotive industry is continually seeking economic solutions that meet global technical regulations for pedestrian safety.

BRIEF DESCRIPTION

Disclosed, in various embodiments, are asymmetric energy absorbing devices vehicle bumper systems, and methods for making and using the same.

In one embodiment, an asymmetric energy absorber can comprise: a generally triangular section (e.g., a triangular shape) formed by an upper load wall extending from an upper wall first end toward a lower wall to a joining area; a flange, wherein the lower wall is between the flange and the upper wall; a base extending between the lower wall and the flange, wherein the flange extends from a first side of the base; and a rib extending along the base toward the flange, and away from a second side of the base.

In another embodiment, an asymmetric energy absorber can comprise: an upper wall, wherein the upper wall is straight in all directions; a lower wall has a convex cross-sectional geometry; a flange extending at an angle that changes along its length, wherein the flange has a geometry that is a minor image of the lower wall; a base extending between the lower wall and the flange, wherein the flange extends from a first side of the base; and a rib extending from a second side of the base.

In yet another embodiment, an asymmetric energy absorber can comprise: an upper wall and a lower wall defining crush lobes; a flange, wherein the lower wall is between the flange and the upper wall; a base extending between the lower wall and the flange, wherein the flange extends from a first side of the base; and a rib extending along the base toward the flange and away from a second side of the base.

In an embodiment, a vehicle bumper system, can comprise: a bumper beam having an outer face and a bottom surface; an asymmetric energy absorber. The asymmetric energy absorber can comprise: a generally triangular shaped section formed by an upper wall extending from an upper wall first end toward a lower wall to a joining area; a base extending from a second end of the lower wall opposite the joining area and in a direction away from the upper wall; a flange extending away from the base, below the lower wall; and a rib extending from the base along the bottom surface of the bumper beam.

These and other features and characteristics are more particularly described below.

BRIEF DESCRIPTION OF THE DRAWINGS

The following is a brief description of the drawings wherein like elements are numbered alike and which are presented for the purposes of illustrating the exemplary embodiments disclosed herein and not for the purposes of limiting the same.

DETAILED DESCRIPTION

Figure 1:
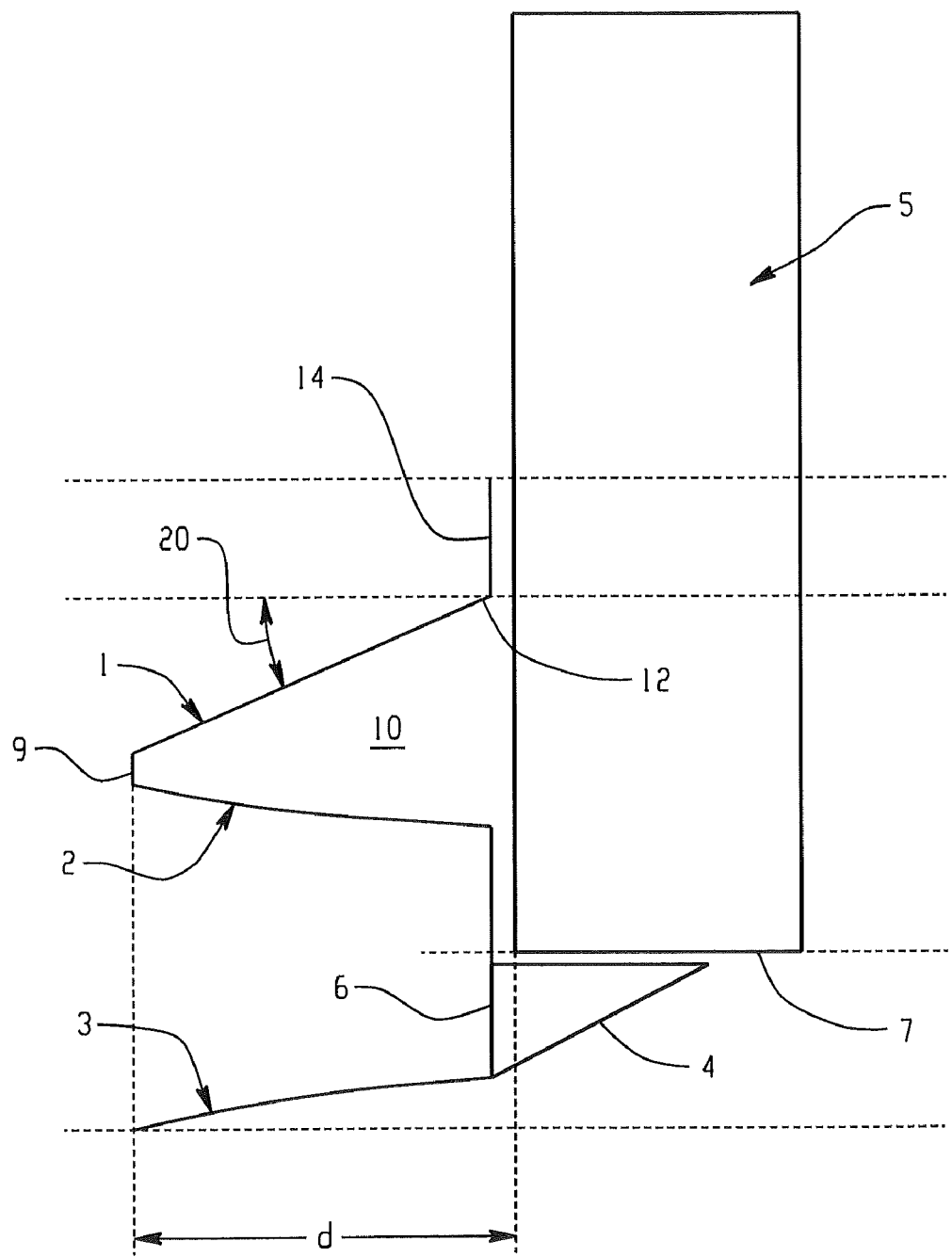
FIG. 1 is a cross-sectional, schematic view of an embodiment of an asymmetric energy absorber.

Disclosed herein, in various embodiments, are energy absorber (energy absorber) designs for automotive bumpers for pedestrian safety. These designs combine the standard energy absorber for low speed impacts (e.g., speeds of less than or equal to 15 kilometers per hour (kmph)) with the lower-leg impact of the Flexible Pedestrian (Flex-Pli) leg-form impactors, thereby eliminating the need for a separate lower spoiler assembly and/or asymmetric bumper beam to control the challenging knee bending targets. Avoiding asymmetric bumper beam facilitates more controlled high-speed impact performance, and better air intake for cooling the tower assembly. In some embodiments the asymmetric energy absorber is a single piece injection molded solution without need of lower spoiler assembly, which gives significant advantage for system cost and weight reduction.

It is understood that relocating the bumper beam in a vehicle is not optional. However, knee bending is a problem, there is lack of a support element below the bumper beam to which an energy absorber can be attached. The asymmetric design set forth herein enables the energy absorber to extend below the bumper beam and thereby provide knee bending protection during an impact. The structural integrity for the portion of the energy absorber located below the bumper beam is a rib that transfers energy from the extension portion to and attains support from the bottom surface of the bumper beam.

An innovative asymmetric triangular section absorber configuration is designed, where upper load walls can be softer (a lower structural integrity) than lower load walls for controlled energy absorption, and a stiffer cantilever wall designed below the stiffer lower load wall to support the lower leg and control knee bending. The design can be a single piece solution that meets the global technical regulation (GTR) requirements for pedestrian safety with a more than 10% safety margin evaluated for a 50 millimeter (mm) packaging space and can avoids the need of asymmetric beam modifications. In this design, an upper wall can be a straight wall while the two lower walls can be curved (e.g., have a parabolic shape thereto), this design can enable controlled crushing and energy absorption.

Several categories of damages and injuries are possible when an automobile accident occurs. One category relates to the safety of pedestrians who may be injured during a vehicle to pedestrian impact event. Another category relates to the damage of the vehicle components when an impact with another vehicle or object occurs. Still another category relates to the injury and safety of vehicle occupants during an impact with another vehicle or object. Injuries and vehicle damage in the latter two categories are generally reduced with the use of a bumper beam, crash cans, airbags, seatbelts, etc. Energy absorbers formulated for pedestrian protection are utilized to assist in reducing the injuries suffered by a pedestrian upon an impact with a vehicle. Energy absorbers are generally located directly in front of a bumper beam to protect the pedestrian upon a collision with a vehicle, and to allow the bumper beam to provide the necessary structural integrity to enable the desired crushing and energy absorption characteristics. For example, designs such as those set forth in FIGS. 6 and 7 rely upon the bumper beam in order to function as designed.

The elements of the present energy absorber include an upper load wall, a lower load wall that form a generally triangular shape that diverges from a front wall, wherein the lower load wall extends from a base to the front wall. As used herein, generally triangular refers to the fact that the triangular shape can have curved side(s) and a front wall (e.g., not end in a point). Also extending from the same side of the base as the lower load wall is a flange (e.g., a cantilevered knee support element). Extending from the opposite side of the base is a rib. The rib is located along the portion of the base designed to be disposed beneath a bumper beam such that one side of the rib extends along the base and an adjacent side of the rib will extend along the bottom of a bumper beam when the energy absorber is attached to a vehicle. Optionally, the energy absorber can comprise a section row of crush lobes that extend across and are aligned with the bumper beam, e.g., above upper wall 1 (also referred to as the upper load wall). (See FIG. 1) The specific configuration of these optional crush lobes can be triangular, C-shaped lobes, or any combination that attains the desired energy absorption characteristics.

In some embodiments, instead of the upper and lower load walls forming a triangular configuration, the presently disclosed flange and rib configuration can be used in conjunction with a C-section energy absorber (e.g., an energy absorber that has a cross-sectional geometry of a "C"). For example, a geometry like that of FIGS. 6 and 7 wherein the flange would extend from the base 16, in the same direction as the lobes 18, with a rib(s) extending in the opposite direction (e.g., elements 3, 4, and 6 from FIG. 1 added to the energy absorber of FIG. 6).

Exemplary characteristics of the energy absorbing assembly include high toughness/ductility, thermal stability (e.g., −30° C. to 60° C.), high energy absorption capacity, a good modulus-to-elongation ratio, and recyclability, among others, wherein "high" and "good" are intended to mean that the characteristic at least meets vehicle safety regulations and requirements for the given component/element. The energy absorber can comprise any thermoplastic material or combination of thermoplastic materials that can be formed into the desired shape and provide the desired properties. Exemplary materials include thermoplastic materials as well as combinations of thermoplastic materials with elastomeric materials, and/or thermoset materials. Possible thermoplastic materials include polybutylene terephthalate (PBT); acrylonitrile-butadiene-styrene (ABS); polycarbonate; polycarbonate/PBT blends; polycarbonate/ABS blends; copolycarbonate-polyesters; acrylic-styrene-acrylonitrile (ASA); acrylonitrile-(ethylene-polypropylene diamine modified)-styrene (AES); phenylene ether resins; blends of polyphenylene ether/polyamide; polyamides; phenylene sulfide resins; polyvinyl chloride PVC; high impact polystyrene (HIPS); low/high density polyethylene (L/HDPE); polypropylene (PP); expanded polypropylene (EPP); and thermoplastic olefins (TPO). For example, the bumper beam, energy absorber, and/or crash can comprise Xenoy® resin, which is commercially available from SABIC Innovative Plastics IP B.V. An exemplary filled resin is STAMAX® resin, which is a long glass fiber filled polypropylene resin also commercially available from SABIC Innovative Plastics IP B.V. The bumper beam, energy absorber, and/or crash cans can also be formed from combinations comprising at least one of any of the above-described materials.

The overall size, e.g., the specific dimensions of the energy absorber will depend upon the specific vehicle for which the energy absorber is intended. For example, the length (l), height (h), and width (w) of the energy absorbing assembly, will depend upon the amount of space available in the desired location of use as well as the needed energy absorption. The depth and wall thickness of the energy absorber will also depend upon the available space, desired stiffness, and the materials (or combination of materials) employed. The depth "d" of the energy absorber (and hence the crush lobes), is generally bounded by the distance between the fascia and the bumper beam. In various designs the distance can be less than or equal to 60 millimeters (mm), specifically, less than or equal to 50 mm, and more specifically, 40 mm to 50 mm). In some embodiments, the wall thickness of the upper load wall, lower load wall, and flange can, independently, be less than or equal to 4.5 mm, specifically, 1.8 mm to 4.0 mm, and more specifically, 2.1 mm to 3.8 mm. In some embodiments, the upper load wall is thinner than the lower load wall. Specifically, the upper load wall can have a thickness that is 65% to 80% of the thickness of the lower load wall. For example, the upper load wall can have a thickness of 2.0 mm to 2.5 mm, while the lower load wall can have a thickness of 2.8 mm to 3.3 mm. The flange can have a thickness that is thicker than the upper load wall (e.g., it can be the same as the lower load wall). For example, the flange can have a thickness of 2.8 mm to 3.3 mm. The rib thickness can be even thicker than the flange and the lower load wall. Specifically, the rib can have a thickness that is 110% to 150% of the thickness of the lower load wall. For example, the rib can have a thickness of 3.5 mm to 4.2 mm.

A more complete understanding of the components, processes, and apparatuses disclosed herein can be obtained by reference to the accompanying drawings. These figures (also referred to herein as "FIG.") are merely schematic representations based on convenience and the ease of demonstrating the present disclosure, and are, therefore, not intended to indicate relative size and dimensions of the devices or components thereof and/or to define or limit the scope of the exemplary embodiments. Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

To meet the Global Technical Regulations (GTR) requirements for pedestrian protection and low speed crash countermeasures, an asymmetric triangular section energy absorber is designed as shown in FIG. 1. This design includes an upper load wall 1 and lower wall 2 (also referred to as the lower load wall) configured to be located in front of the bumper beam 5. As illustrated in FIG. 1, upper load wall 1 and lower load wall 2 extend (in the z and y directions, see FIG. 2) to form a generally triangular design with the walls converging away from the bumper beam 5, to form a cavity 10 defined by the upper load wall 1, lower load wall 2, and the front wall 9 (also referred to as the joining area). In various embodiments, the upper load wall 1 is configured to guide the crushing during impact. Therefore, this wall can be straight (e.g., can extend from the wall 9 with no curvature; the angle 20 (see FIG. 1) at which it extends does not change along its length). This wall can also be flat (e.g., straight in the x direction (see FIGS. 2 and 5)), e.g., not crowned. In various embodiments, the angle at which the upper load wall extends downward (e.g., angle 20), can be 4 to 70 degrees, specifically, 4 to 40 degrees, more specifically, 5 degrees to 15 degrees.

Figure 4:
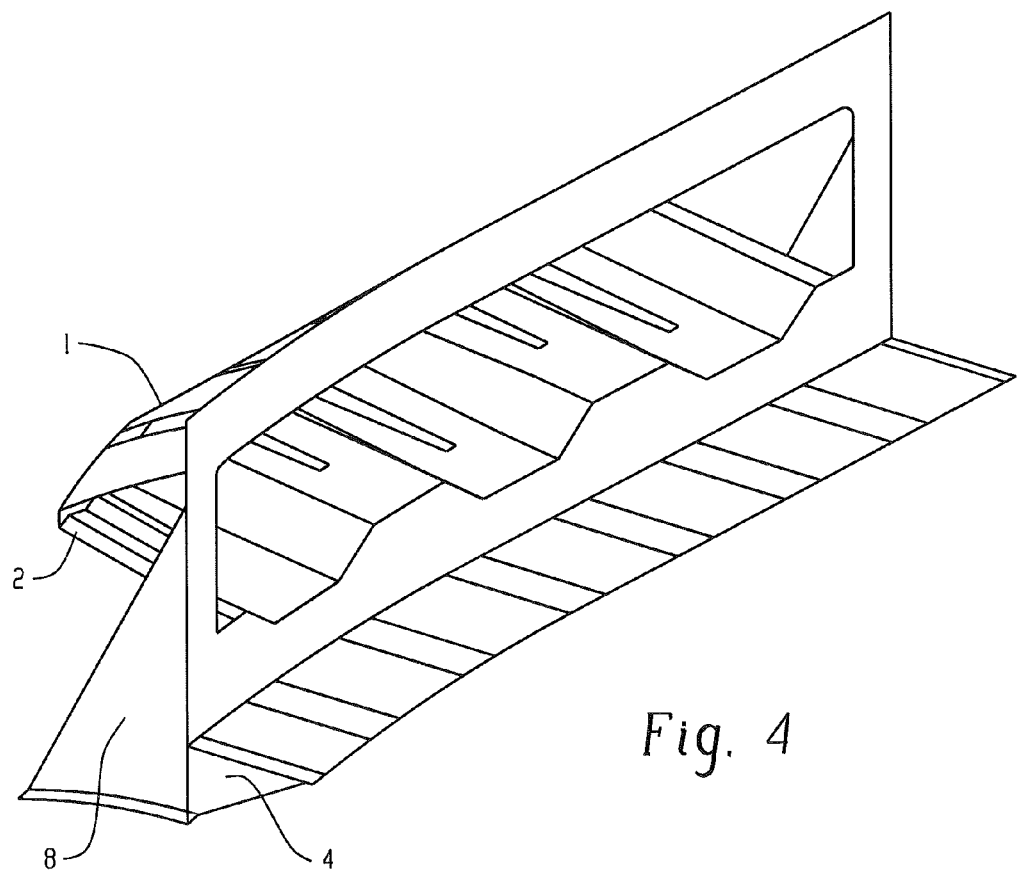
FIG. 4 is a prospective side view of a single element of the energy absorber of FIG. 2.

The lower load wall 2 can be configured to crush during impact. In some embodiments, the lower load wall 2 can be non-linear (i.e., curved; the angle at which it extends from the base to the end of the wall changes along its length). For example, this load wall 2 can extend from the base 6 and can curve toward the upper load wall 1, e.g., with a parabolic, elliptical, or cubical profile. (See also FIG. 8) Additionally, or alternatively, the lower load wall 2 can also be crowned, (e.g., convex; curved along the x direction). (See FIG. 4) For example, in some embodiments, the lower wall 2 is not crowned, but extends from the base toward the upper load wall 1 without curving toward load wall 1 (e.g., it extends straight).

Located below the bumper beam 5 is a flange 3 extending away from the body of the vehicle (not shown) which functions as leg support below the lower load wall 2. In some designs, the flange 3 can have the same shape and curvature angle as the lower load wall 2, yet extend away from lower wall 2 (e.g., can be a mirror image thereof). The flange can have the same or a different thickness as the lower load wall 2. In some embodiments, the thickness of the flange 3 is 2.5 mm to 3.5 mm, specifically, 2.8 mm to 3.3 mm, e.g., 3.2 mm.

Figure 5:
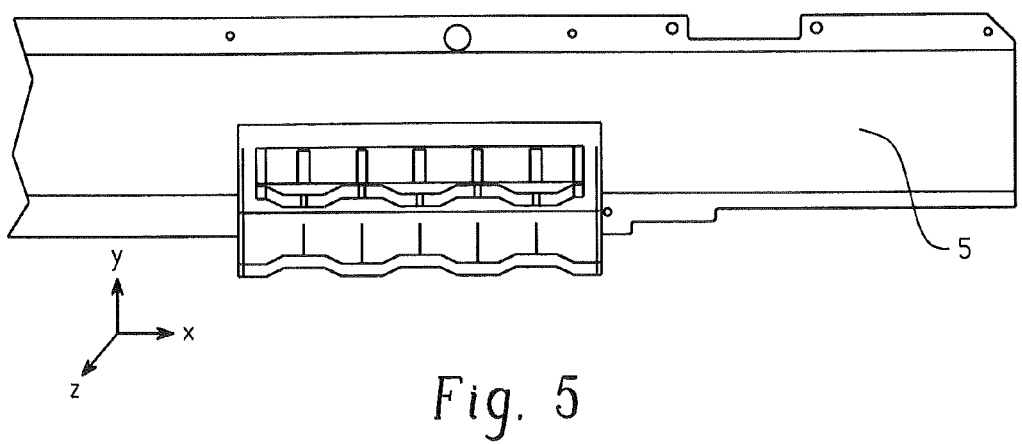
FIG. 5 is a partial prospective front view of the energy absorber of FIG. 2 mounted on a symmetric bumper beam.
Figure 8:
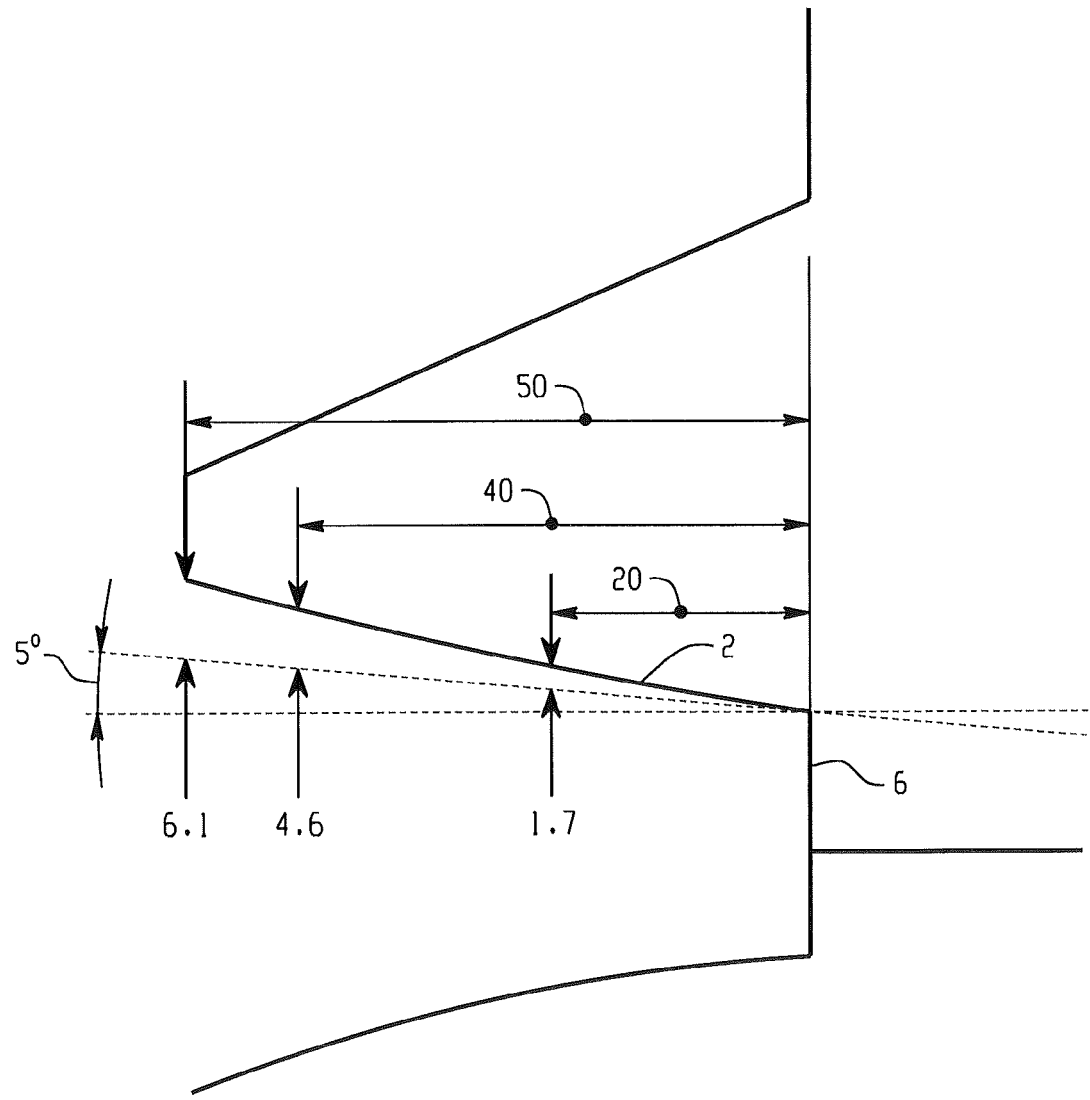
FIG. 8 is a schematic side representation of an exemplary embodiment of the asymmetric energy absorber illustrating the parabolic curvature.

The lower load wall 2 and/or the flange 3 can be curved, e.g., have a parabolic curvature away from the base 6. For example, lower load wall 2 can have a parabolic outward curvature in the z direction, while the flange 3 can have a parabolic inward curvature in the z direction (the directions are illustrated in FIG. 5). This curvature can be smooth and continuous or can have a flat portion in the middle. In some embodiments, the degree of curvature of the lower load wall 2 and/or the flange 3 can be defined as mathematically parabolic in nature. For example, the curve can move away from a draft of 2 degrees to 10 degrees, specifically, 2 degrees to 7 degrees, and more specifically, 5 degrees. FIG. 8 is a schematic representation of an embodiment of the asymmetric energy absorber. This figure illustrates the parabolic curvature of the walls and provides a specific example. In this particular embodiment, the curve (lower load wall 2) moves away from a 5 degree draft. As such, at 20 mm from the base 6, the lower load wall 2 is a distance of 1.7 mm from the 5 degree line, at 40 mm from the base 6, the lower load wall 2 is a distance of 4.6 mm from the 5 degree line, and at 50 mm from the base 6, the lower load wall 2 is a distance of 6.1 mm from the 5 degree line.

The lower load wall 2 and/or the flange 3 can have an undulating geometry, e.g., can have a waffle (also known as corrugated geometry). The curve of the flange in the "z" direction can be a parabolic curvature away from the base 6. For example, lower load wall 2 can have a parabolic outward curvature in the z direction, while the flange 3 can have a parabolic inward curvature in the z direction. This curvature can be smooth and continuous or can have a flat portion in the middle. In some embodiments, the degree of curvature of the lower load wall 2 and/or the flange 3 can be defined as, mathematically parabolic in nature. For example, the curve can move away from a draft of 2 degrees to 10 degrees, specifically, 2 degrees to 7 degrees, and more specifically, 5 degrees. FIG. 8 is a schematic representation of an embodiment of the asymmetric energy absorber. This figure illustrates the parabolic curvature of the lower load wall and the flange and provides a specific example. In this particular embodiment, the curve (lower load wall 2) moves away from a 5 degree draft. As such, at 20 mm from the base 6, the lower load wall 2 is a distance of 1.7 mm from the 5 degree line, at 40 mm from the base 6, the lower load wall 2 is a distance of 4.6 mm from the 5 degree line, and at 50 mm from the base 6, the lower load wall 2 is a distance of 6.1 mm from the 5 degree line.

Similarly, the lower load wall 2 and/or the flange 3 can have an undulating geometry, e.g., can have a waffle (also known as corrugated) geometry in the x direction. The waffle geometry can comprise peaks 30 and valleys 32. (See FIG. 2) The peaks and/or valleys can be a parabolic curvature in the z direction as mentioned above. In the x direction the peaks can extend to the valleys with straight or curved walls, with the top of the peak and/or the base of the valley being straight or curved. In some embodiments, a peak can have a parabolic curvature in the z direction and extend in the x direction down to a valley, via a straight wall (no curvature in the x direction) and the valley can extend straight in the x direction to a straight wall which extends up to another peak, wherein the peaks can also extend straight (no curvature) in the x direction.

The number of peaks 30 and valleys 32 in a single lobe is dependent upon the desired size of the lobe and the desired number of end walls 8 in the final energy absorber. In some embodiments, a single lobe comprises 1 to 10 crowns, specifically, 2 to 8 crowns, and more specifically, 2 to 5 crowns. In an embodiment, a single lobe comprises 1 to 10 valleys, specifically, 2 to 8 valleys, and more specifically, 2 to 5 valleys. Located at each end of a single lobe can be an end wall 8. The number of lobes forming an energy absorber is dependent upon the size of the vehicle, specifically, the length of the bumper beam. In some embodiments, an energy absorber comprises 1 to 15 lobes, specifically, 3 to 12 lobes, and more specifically, 4 to 10 lobes.

In order to provide added structural integrity to the flange in the impact direction (e.g., the z direction), rib(s) 22 can be disposed on the crown(s) and/or in the valley(s) 32. These ribs can have a triangular design with a first wall of the rib extending along the flange in the z direction. The rib 22 can have a length in the z direction that is less than or equal to 75% of the flange 3 length, specifically, a length in the z direction that is 10% to 60% of the flange 3 length, and more specifically, a length in the z direction that is 30% to 50% of the flange 3 length. In some embodiments, the rib 22 can have a length in the z direction of less than or equal to 60 mm, specifically, 10 mm to 30 mm, and more specifically, 15 to 25 mm. An adjacent wall of the rib 22 can extend along the base 6 in the y direction a sufficient distance such that when the absorber is installed in a vehicle, a portion of rib extends up a portion of the front face bumper beam. In other words, during an impact, the rib 22 is designed to transfer impact energy to the bumper beam. As is clear from the figures, the length of this wall is dependent upon whether the rib is located on a peak 30 or a valley 32. If located on a peak 30, the rib 22 can have a length in the y direction of less than or equal to 40 mm, specifically, 5 to 25 mm, and more specifically, 10 mm to 15 mm. If the rib is located in a valley 32, the rib 22 can have a length in the y direction of less than or equal to 60 mm, specifically, 5 mm to 40 mm, and more specifically, 15 to 25 mm.

The thickness of this rib 22 can be similar to the thickness of the flange 3. For example, the thickness can be less than or equal to 4.5 mm, specifically, 1.8 mm to 4.0 mm, more specifically, 2.1 mm to 3.8 mm, and yet more specifically, a thickness of 2.8 mm to 3.3 mm.

Support rib(s) 4 can be located adjacent the base 6 and the bumper beam 5 so as to exact support from the lower surface 7 of the bumper beam 5. The rib 4 has a sufficient height so that it extends a sufficient distance along the bottom of the bumper beam to attain the desired support from the bumper beam. The rib can extend along greater than or equal to 40% of the beam surface 7, specifically greater than or equal to 50%, and more specifically, greater than or equal to 60%. For example, the rib can extend greater than or equal to 10 mm away from the base 6, specifically 20 mm to 70 mm, and more specifically, 30 mm to 50 mm. Similarly, the rib extends along the base 6 a sufficient distance to attain the desired support of the flange 3. In some embodiments, the rib extends along the entire distance of the base that extends below the bumper beam. In some embodiments, the thickness of the rib can be less than or equal to 5 mm, specifically, 2 mm to 4.5 mm, and more specifically, 3.5 mm to 4.2 mm.

The lower load wall can be crowned or corrugated (e.g., undulating) for efficient energy absorption. The lower load wall can be designed to be the primary load-carrying wall. The required G-Load performance is achieved by tuning the lower load wall 2, while the upper load wall can be used to guide the crushing. The upper load wall (e.g., without corrugation or crowning) can be much softer than lower load wall. In such a fashion, the upper load wall can guide the controlled crushing of lower load wall wherein the upper load wall may not crush but may swing about a top edge to guide the crushing of lower load wall. The lower load wall will crush over the plastic beam to absorb significant energy during impact. The leg support flange bend downward during the impact and support the lower leg to control the rotation. The energy absorber support ribs help attain the proper reaction for overhanging leg-support, from beam bottom surface.

The flange 3 can be supported by end wall(s) 8 that extend from the base 6. These end walls 8 can have a generally triangular geometry. They can extend along flange 3, up to 100% thereof. In some embodiments, the hypotenuse of end wall 8 can extend from near the end 12 of the upper load wall 1 to a point along the flange 3 such that the base of end wall 8 has a length that is greater than or equal to 50% of the flange length, specifically, greater than or equal to 60% of the flange length, and more specifically, 65% to 80% of the flange length. In some designs the end wall are only located at the two ends of the entire energy absorber (e.g., opposite ends of the bumper beam). In other embodiments, end wall an end wall can be located at each end of the energy absorber, with additional end walls located between a group of lobes (e.g., a lobe can be defined by an upper load wall, lower load wall with a single crown, and flange with a single crown). The number of lobes in each group can be 1 or more than 1, specifically 3 to 20, more specifically 4 to 10.

Extending up from the end 12 of the upper load wall 1 can be a lip 14. The lip 14 can be configured to be oriented parallel to the front surface of the bumper beam 5, e.g., parallel to and in the same plane as the base 6. The lip 14, which can serve as a base for the upper load wall and/or can be used for mounting (e.g., snap fit) of the energy absorber to the beam, can have a length that is 25% to 75% of the length of the base 6, specifically, 30% to 55% of the length of the base 6.

The overall weight of each lobe (and hence the energy absorber) can be reduced by incorporating openings into the upper load wall and/or the lower load wall. The number of openings and the size of the openings is dependent upon the desired crash characteristics of the walls and the desired structural integrity. In some embodiments, openings can be arranged such that a larger opening in the upper load wall is adjacent a valley 36 in the lower load wall, and a smaller opening is adjacent a peak 34 in the lower load wall. The opening in the upper load wall can have a width (in the x direction) of 5 mm to 50 mm, specifically, 5 mm to 30 mm, and more specifically, 10 mm to 30 mm. For example, the larger openings can have a width of 18 mm to 25 mm, while the smaller openings can have a width of 8 mm to 14 mm. The length (in the z direction) of all of the openings is depending upon the structural integrity with the maximum length while retaining structural integrity desired. In some embodiments, the openings have a length of greater than or equal to 70% of the length of the load wall (in the z direction), specifically, greater than or equal to 80%, and more specifically, 85% to 95%. The shape of the opening is similarly dependent upon structural integrity; a balance of maximum weight reduction while maintaining structural integrity. In some embodiments, the geometry can be rectangular, trapezoidal, a converging shape, or a combination thereof. For example, the openings in the lower load wall can be trapezoidal, e.g., having a width at an end adjacent wall 9 of about 15 mm to 25 mm, and a width at an end adjacent the base 6 of less than or equal to 12 mm. It is also understood that different size openings can be employed in the same lobe, e.g., alternating sized openings (see FIG. 2).

The energy absorber can be formed by various molding techniques, such as injection molding, compression molding, and the like, depending upon the specific desired features of the asymmetric energy absorber and the capabilities of the molding method.

The energy absorbing assembly is further illustrated by the following non-limiting examples. It is noted that all of the examples were simulations.

EXAMPLES

Example 1

Lower Leg Impact Performance

Figure 2:
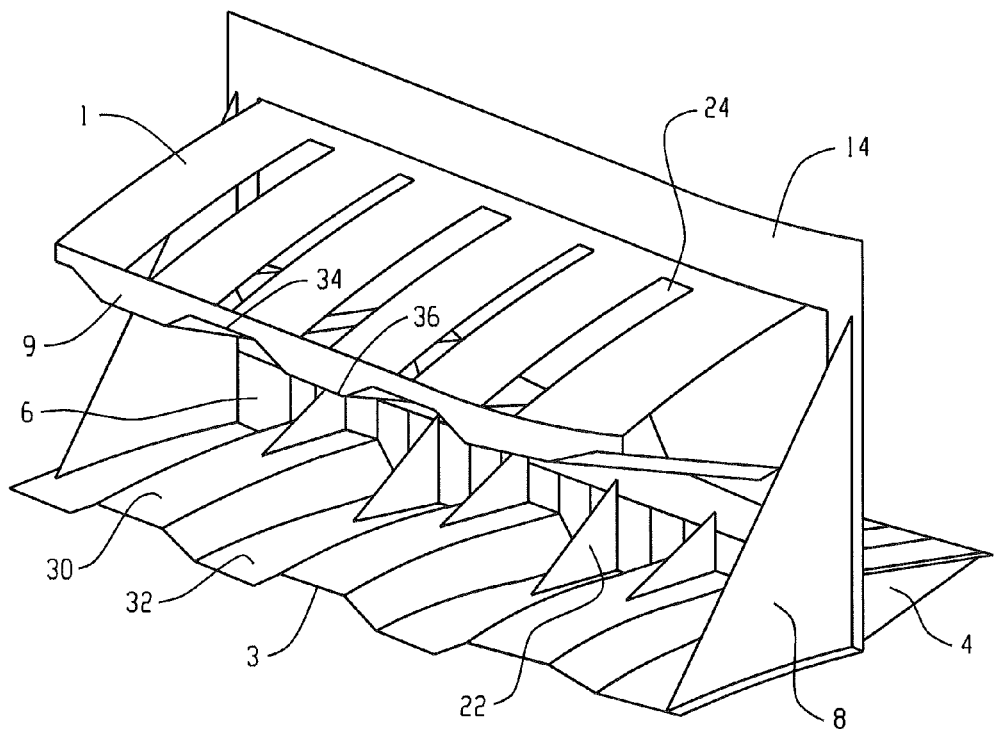
FIG. 2 is front view of an embodiment of the energy absorber of FIG. 1.
Figure 3:
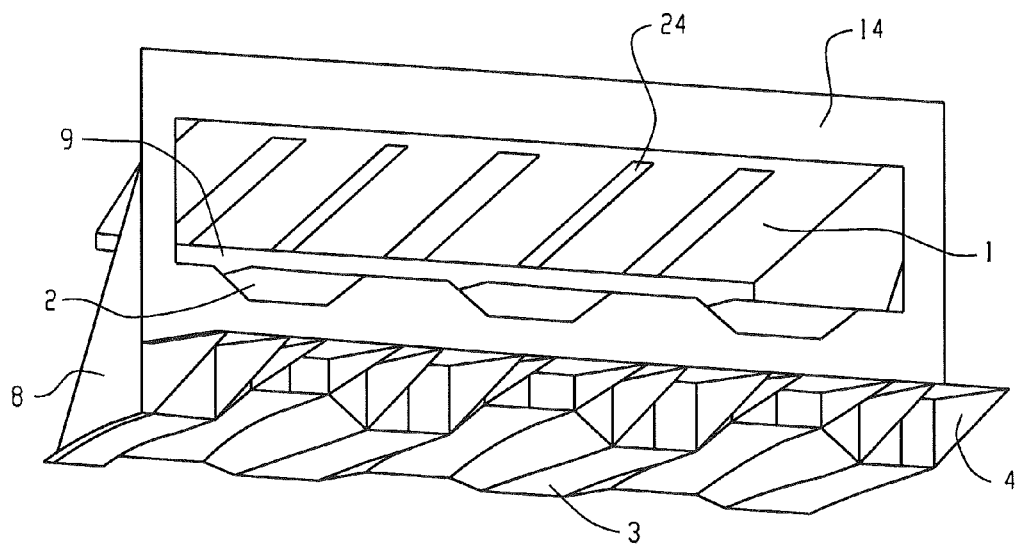
FIG. 3 is a top view of the embodiment of the energy absorber of FIG. 2.

Sample 1 is the energy absorber illustrated in FIGS. 1-4 having a triangular cross-sectional geometry (see FIG. 1, walls 1 and 2). This energy absorber, which is a single, unitary component formed from Xenoy® resin, extends beyond the bumper beam a distance of 50 mm (see FIG. 1, "d"), with the rib 4 extending under the bumper beam 30 mm. The upper load wall, lower load wall, cantilever flange and the bottom ribs have thickness of 2.1 mm, 3.2 mm, 3.2 mm, and 3.8 mm, respectively. The upper load wall is designed flat (no curvature), with a draft of 10 degree downward (angle 20 is 10 degrees). The lower load wall and the cantilever flange have a draft of 6 degrees and 4 degrees respectively, crowned parabolically 5 mm from base to the front and includes corrugation of 5 mm depths (e.g., the waffle like geometry as is illustrated in FIGS. 2-3, wherein "D" is a 5 mm up and down waffle shape structure). The bottom ribs are triangular in shape, flat (no curvature). The upper lip is flat following the profile of beam front face and having height of 15 mm.

Figure 6:
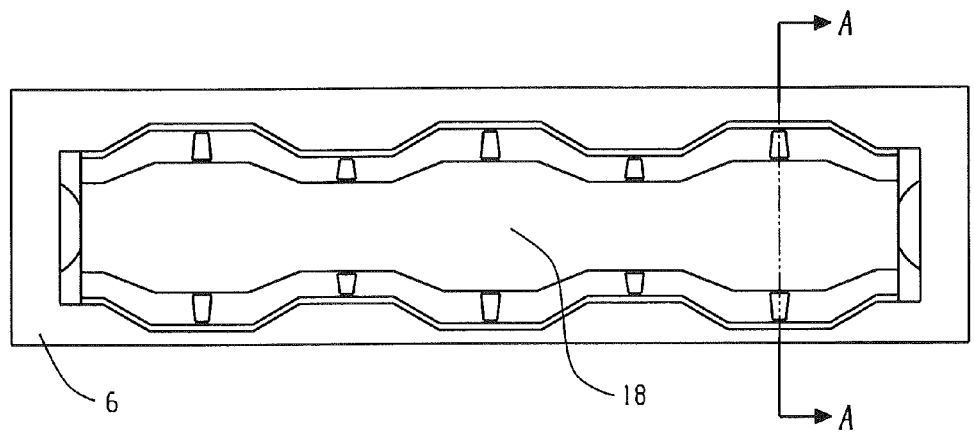
FIG. 6 is a front view of an embodiment of a symmetric energy absorber.
Figure 7:
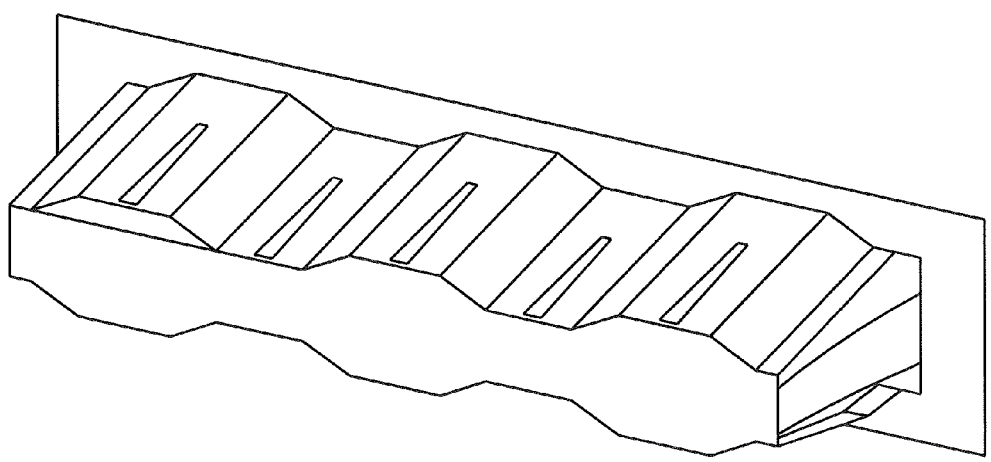
FIG. 7 is a prospective top view of the energy absorber of FIG. 6.

The Comparative Example (CE) 1 is the design illustrated in FIGS. 6 and 7, namely a "C" cross-sectional geometry (taken along lines A-A). The comparative sample is an optimized conventional C-section design, made of the same Xenoy® resin, with thickness of 2.8 mm. Trapezoidal slots (openings) are provide to control the crushing. The top and bottom load walls are drafted at 4 degrees, crowned parabolically 5 mm from bottom to front face, and having corrugations of 5 mm depth.

Table 1 sets forth the results of the testing.

TABLE 1

| Sample No. | Impact Location | G-load (g) | Rotation (degree) | Sheer (mm) |
| --- | --- | --- | --- | --- |
| CE 1 | outboard | 147.7 | 19.9 | 5.5 |
| 1 | outboard | 150 | 11.9 | 4.7 |

As can be seen from Table 1, with the present design, Sample 1, an improvement in knee bending (rotation) of greater than 40% was attained with the present design. Therefore, even without the addition of a spoiler, knee bending can be reduced from about 20 degrees to about 12 degrees with the use of the asymmetric triangular section energy absorber. Therefore, the present energy absorber design, e.g., the use of the flange and supported rib disposed opposite thereof, can eliminate the need of an additional component (e.g., spoiler).

Approaches to address the critical knee bending target that employed a two piece solution, an energy absorber and a lower leg support and/or that extended the bumper beam bottom flange, thereby making it asymmetric. These designs introduced uncontrolled high speed impact performance issues and/or increased the packaging space while compromising vehicle styling. The present designs can eliminate the need for a stiff lower spoiler (e.g., steel beam), can avoid the need for an asymmetric bumper beam, enables more controlled high speed impact performance and better air intake management for the intercooler (e.g., compared to an asymmetric bumper beam system), provides a single piece solution, enables greater design freedom, and/or can reduce bumper weight.

In one embodiment, an asymmetric energy absorber can comprise: a generally triangular section formed by an upper load wall extending from an upper wall first end toward a lower wall to a joining area; a flange, wherein the lower wall is between the flange and the upper wall; a base extending between the lower wall and the flange, wherein the flange extends from a first side of the base; and a rib extending along the base toward the flange, and away from a second side of the base.

In another embodiment, an asymmetric energy absorber can comprise: an upper wall, wherein the upper wall is straight in all directions; a lower wall has a convex cross-sectional geometry; a flange extending at an angle that changes along its length, wherein the flange has a geometry that is a minor image of the lower wall; a base extending between the lower wall and the flange, wherein the flange extends from a first side of the base; and a rib extending from a second side of the base.

In yet another embodiment, an asymmetric energy absorber can comprise: an upper wall and a lower wall defining crush lobes; a flange, wherein the lower wall is between the flange and the upper wall; a base extending between the lower wall and the flange, wherein the flange extends from a first side of the base; and a rib extending along the base toward the flange and away from a second side of the base.

In an embodiment, a vehicle bumper system, can comprise: a bumper beam having an outer face and a bottom surface; an asymmetric energy absorber. The asymmetric energy absorber can comprise: a generally triangular shaped section formed by an upper wall extending from an upper wall first end toward a lower wall to a joining area; a base extending from a second end of the lower wall opposite the joining area and in a direction away from the upper wall; a flange extending away from the base, below the lower wall; and a rib extending from the base along the bottom surface of the bumper beam.

In the various embodiments: (i) the flange can be crowned in a cross direction (e.g., in an x direction); and/or (ii) the lower wall can be crowned in a cross direction (e.g., in an x direction, crowned toward the flange); and/or (iii) the lower wall can have parabolic curve along its length toward the upper wall (e.g., in the z direction); and/or (iv) the upper wall can be straight along its length (e.g., in the z direction) and flat in a cross direction (e.g., not curved and not crowned); and/or (v) the lower wall geometry can be a minor image of the flange geometry; and/or (vi) the flange can be curved away from the lower wall (e.g., in the z direction); and/or (vii) triangular end wall(s) located at opposite ends of the energy absorber, the end walls having a hypotenuse extending from a second end of the upper wall opposite the point, toward the flange; and/or (viii) an open area bounded by the lower wall, the flange, and the base, and optionally, the end walls; and/or (ix) the lower wall, base, and flange can define an open area; and/or (x) the peaks and/or valleys of the flange can comprise a rib.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to d one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. An asymmetric energy absorber, comprising:
a generally triangular section formed by an upper load wall extending from an upper wall first end toward a lower wall to a joining area;
a flange having an undulating geometry, wherein the lower wall is between the flange and the upper wall;
a base extending between the lower wall and the flange, wherein the flange extends from a first side of the base; and
a rib extending along the base toward the flange, and away from a second side of the base.

2. The asymmetric energy absorber of claim 1, wherein the flange is crowned, in an x direction, toward the lower wall.

3. The asymmetric energy absorber of claim 1, wherein the lower wall is crowned, in an x direction, toward the flange.

4. The asymmetric energy absorber of claim 1, wherein the lower wall has a parabolic curve, along its length, toward the upper wall, in a z direction.

5. The asymmetric energy absorber of claim 1, wherein the upper wall is straight along its length and flat in a cross direction.

6. The asymmetric energy absorber of claim 1, wherein the lower wall geometry is a mirror image of the flange geometry.

7. The asymmetric energy absorber of claim 1, wherein the flange is curved along its length away from the lower wall.

8. The asymmetric energy absorber of claim 1, further comprising a triangular end walls located at opposite ends of the energy absorber, the end walls having a hypotenuse extending from a second end of the upper wall opposite the point toward the flange.

9. The asymmetric energy absorber of claim 8, comprising an open area bounded by the lower wall, the flange, the base, and end walls.

10. The asymmetric energy absorber of claim 1, wherein the lower wall, base, and flange define an open area.

11. The asymmetric energy absorber of claim 1, wherein the flange has a thickness than is thicker than an upper wall thickness.

12. The asymmetric energy absorber of claim 1, further comprising another rib extending from a second side of the base.

13. An asymmetric energy absorber, comprising:
an upper wall, wherein the upper wall is straight in all directions;
a lower wall has a convex cross-sectional geometry;
a flange extending at an angle that changes along its length, wherein the flange has a geometry that is a minor image of the lower wall;
a base extending between the lower wall and the flange, wherein the flange extends from a first side of the base; and
a rib extending from a second side of the base.

14. A vehicle bumper system, comprising
a bumper beam having an outer face and a bottom surface;
an asymmetric energy absorber, comprising:
a generally triangular section formed by an upper wall extending from an upper wall first end toward a lower wall to a joining area;
a base extending from a second end of the lower wall opposite the joining area and in a direction away from the upper wall;
a flange extending away from the base, below the lower wall; and
a rib extending from the base along the bottom surface of the bumper beam.

15. The vehicle bumper system of claim 14, wherein the flange is crowned, in an x direction, toward the lower wall.

16. The vehicle bumper system of claim 14, wherein the lower wall is crowned, in an x direction, toward the flange.

17. The vehicle bumper system of claim 14, wherein the upper wall is straight along its length and flat in a cross direction.

18. The vehicle bumper system of claim 14, wherein the flange is curved along its length away from the lower wall.

19. The vehicle bumper system of claim 14, further comprising a triangular end walls located at opposite ends of the energy absorber, the end walls having a hypotenuse extending from a second end of the upper wall opposite the point toward the flange.

20. The vehicle bumper system of claim 14, wherein the flange has an undulating geometry.

21. An asymmetric energy absorber, comprising:
an upper wall and a lower wall defining crush lobes;
a flange, wherein the lower wall is between the flange and the upper wall;
a base extending between the lower wall and the flange, wherein the flange extends from a first side of the base; and
a rib extending along the base toward the flange and away from a second side of the base;
wherein the energy absorber is asymmetric.

22. The asymmetric energy absorber of claim 21, wherein the flange has an end opposite the base that is unconnected.

23. The asymmetric energy absorber of claim 21, wherein the flange is a cantilever flange.

24. The asymmetric energy absorber of claim 21, further comprising another rib extending from a second side of the base.

* * * * *